(12) United States Patent
Kokubo et al.

(10) Patent No.: US 12,548,653 B2
(45) Date of Patent: Feb. 10, 2026

(54) MEDICAL SYSTEM AND COMPUTER PROGRAM

(71) Applicant: NTT DOCOMO BUSINESS, Inc., Tokyo (JP)

(72) Inventors: Ryuta Kokubo, Tokyo (JP); Takeru Umeda, Tokyo (JP); Yoichi Sakurai, Tokyo (JP); Kazuhisa Hayakawa, Tokyo (JP)

(73) Assignee: NTT DOCOMO BUSINESS, Inc., Tokyo (JP)

( * ) Notice: Subject to any disclaimer, the term of this patent is extended or adjusted under 35 U.S.C. 154(b) by 116 days.

(21) Appl. No.: 18/471,344

(22) Filed: Sep. 21, 2023

(65) Prior Publication Data

US 2024/0013879 A1    Jan. 11, 2024

Related U.S. Application Data

(63) Continuation of application No. PCT/JP2022/014098, filed on Mar. 24, 2022.

(30) Foreign Application Priority Data

Mar. 25, 2021 (JP) ................. 2021-052203

(51) Int. Cl.
*H04L 9/08* (2006.01)
*G16H 20/10* (2018.01)
(Continued)

(52) U.S. Cl.
CPC ........... *G16H 20/10* (2018.01); *H04L 9/3213* (2013.01); *H04L 9/50* (2022.05)

(58) Field of Classification Search
CPC ........ G16H 10/60; G16H 20/00; G16H 50/70; G16H 40/20; G16H 80/00
See application file for complete search history.

(56) References Cited

U.S. PATENT DOCUMENTS

2019/0156938 A1    5/2019   Brunner
2019/0198144 A1*   6/2019   Blackley ................ G16H 50/20
(Continued)

FOREIGN PATENT DOCUMENTS

JP     2020-113004 A    7/2020
KR    10-1607530 B1     3/2016
(Continued)

OTHER PUBLICATIONS

Li, Patrick, et al. "DMMS: A decentralized blockchain ledger for the management of medication histories." Blockchain in healthcare today 2 (2019): 38. (Year: 2019).*

(Continued)

*Primary Examiner* — Jason B Dunham
*Assistant Examiner* — Constantine Siozopoulos
(74) *Attorney, Agent, or Firm* — Oblon, McClelland, Maier & Neustadt, L.L.P.

(57) ABSTRACT

A medical system includes an issuer configured to issue data of an electronic prescription relating to a medicine prescribed to a patient and instruct a history management system for recording a token delivery history to issue a token that is information of a delivery target relating to the electronic prescription, and a controller configured to instruct the history management system to deliver the token to a terminal of a recipient of the medicine.

14 Claims, 12 Drawing Sheets

(51) Int. Cl.
  *H04L 9/00* (2022.01)
  *H04L 9/32* (2006.01)

(56) References Cited

U.S. PATENT DOCUMENTS

| | | |
|---|---|---|
| 2019/0237176 A1 | 8/2019 | O'Brien et al. |
| 2019/0361917 A1* | 11/2019 | Tran .................... H04W 12/108 |
| 2022/0246262 A1* | 8/2022 | Stockert ................. G06F 21/31 |

FOREIGN PATENT DOCUMENTS

| | | | |
|---|---|---|---|
| KR | 10-2020-0021349 A | 2/2020 | |
| WO | WO 2018/197739 A1 | 11/2018 | |
| WO | WO-2019152515 A1 * | 8/2019 | ........... B64C 39/024 |

OTHER PUBLICATIONS

Extended European Search Report issued Jul. 19, 2024 in European Patent Application No. 22775794.5, 7 pages.

* cited by examiner

MEDICAL SYSTEM AND COMPUTER PROGRAM

TECHNICAL FIELD

The present invention relates to technology for use in a medicine prescription. Priority is claimed on Japanese Patent Application No. 2021-052203, filed Mar. 25, 2021, the content of which is incorporated herein by reference.

BACKGROUND ART

In recent years, technology for digitizing medical records created by physicians has been proposed (see, for example, Patent Document 1). Such electronic medical record technology has achieved a penetration rate of approximately 50% in general hospitals and general clinics, for instance, in 2017, leading to improved efficiency in healthcare operations.

CITATION LIST

Patent Literature

Patent Literature 1: Japanese Unexamined Patent Application, First Publication No. 2020-113004

SUMMARY OF INVENTION

Technical Problem

However, although the Ministry of Health, Labor and Welfare of Japan has released final reports of pilot projects aimed at the full-scale operation of electronic prescriptions in 2018 in relation to medicine prescriptions, it cannot be said that the desired level of convenience has been fully achieved.

In view of the above circumstances, an objective of the present invention is to provide technology for improving the convenience of a medicine prescription process.

Solution to Problem

According to an aspect of the present invention, there is provided a medical system including: an issuer configured to issue data of an electronic prescription relating to a medicine prescribed to a patient and instruct a history management system for recording a token delivery history to issue a token that is information of a delivery target relating to the electronic prescription; and a controller configured to instruct the history management system to deliver the token to a terminal of a recipient of the medicine.

According to an aspect of the present invention, in the medical system, the history management system is configured using blockchain.

According to an aspect of the present invention, in the medical system, the controller instructs the history management system to deliver the token to a terminal authenticated by an authentication approval system that performs authentication using authentication information among a plurality of terminals.

According to an aspect of the present invention, in the medical system, the controller instructs the history management system to deliver the token to an agent terminal, which is a terminal to which the token has been delivered from a user terminal used by the patient, among a plurality of terminals.

According to an aspect of the present invention, in the medical system, the history management system records information indicating that the token has been delivered to the agent terminal.

According to an aspect of the present invention, in the medical system, the token includes a hash value of the electronic prescription data.

According to an aspect of the present invention, there is provided a non-transitory computer-readable recording medium recording a computer program for causing a computer to perform processes. The processes comprising issuing data of an electronic prescription relating to a medicine prescribed to a patient and instructing a history management system for recording a token delivery history to issue a token that is information of a delivery target relating to the electronic prescription; and instructing the history management system to deliver the token to a terminal of a recipient of the medicine.

Advantageous Effects of Invention

According to the present invention, it is possible to improve the convenience of a medicine prescription process.

EXAMPLE EMBODIMENT

Hereinafter, specific configuration examples of the present invention will be described with reference to the drawings.

First Embodiment

Figure 1:
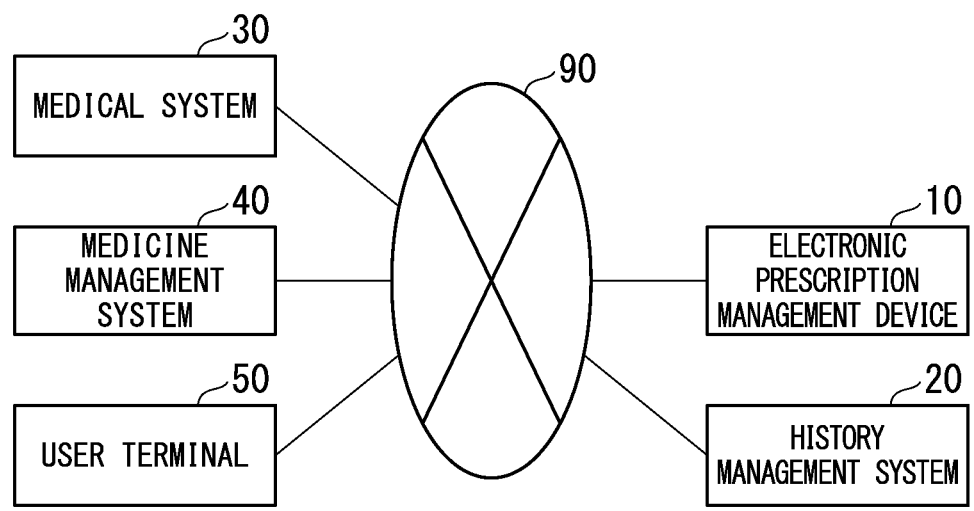
FIG. 1 A schematic block diagram showing a system configuration of a first embodiment of a management system 100 of the present invention.

FIG. 1 is a schematic block diagram showing a system configuration of a first embodiment of a management system 100 of the present invention. The management system 100 includes an electronic prescription management device 10, a history management system 20, a medical system 30, a medicine management system 40, and a user terminal 50. The electronic prescription management device 10, the history management system 20, the medical system 30, the medicine management system 40 and the user terminal 50 perform communication via a network 90. The network 90 may be a network using wireless communication or a network using wired communication. The network 90 may be configured by combining a plurality of networks.

Figure 2:
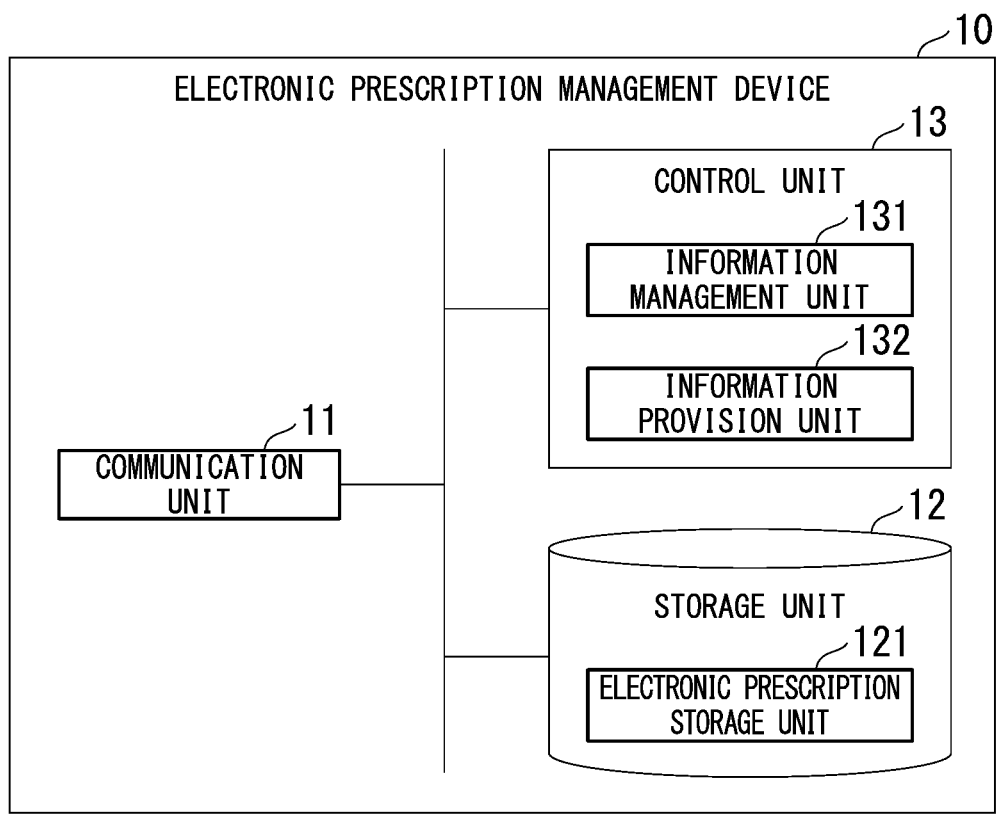
FIG. 2 A schematic block diagram showing a specific example of a functional configuration of an electronic prescription management device 10.

FIG. 2 is a schematic block diagram showing a specific example of the functional configuration of the electronic prescription management device 10. The electronic prescription management device 10 is configured using, for example, an information processing device such as a personal computer or a server device. The electronic prescription management device 10 includes a communication unit 11, a storage unit 12, and a control unit 13.

The communication unit 11 is a communication device. The communication unit 11 may be configured as, for example, a network interface. The communication unit 11 performs data communication with other devices via the network 90 under the control of the control unit 13. The communication unit 11 may be a device that performs wireless communication or may be a device that performs wired communication.

The storage unit 12 is configured using a storage device such as a magnetic hard disk device or a semiconductor storage device. The storage unit 12 stores data used by the control unit 13. The storage unit 12 may function as, for example, an electronic prescription storage unit 121. The electronic prescription storage unit 121 stores data of electronic prescriptions issued by the management system 100. The electronic prescription data includes, for example, data contained in a prescription. The electronic prescription data includes, for example, a medicine prescribed to the user of the user terminal 50 and its usage (a dosing method and the like). The electronic prescription data may be stored in association with specific identification information (for example, a uniform resource identifier (URI)). Electronic prescription data may be stored in formats such as Health Level Seven (HL7) and Fast Health Interoperable Resources (FHIR).

The control unit 13 is configured using a processor such as a central processing unit (CPU) and a memory. The control unit 13 functions as an information management unit 131 and an information provision unit 132 when the processor executes programs. Also, all or some of the functions of the control unit 13 may be implemented using hardware such as an application-specific integrated circuit (ASIC), a programmable logic device (PLD), or a field programmable gate array (FPGA). The above-described program may be recorded on a computer-readable recording medium. Computer-readable recording media include portable media such as a flexible disk, a magneto-optical disc, a read only memory (ROM), a compact disc read only memory (CD-ROM), and a semiconductor storage device (such as a solid-state drive (SSD)), a hard disk built into a computer system, and a storage device such as a semiconductor device. The above-described program may be transmitted via a telecommunication circuit.

The information management unit 131 performs management processes such as new registration, update, and deletion of electronic prescription data stored in the electronic prescription storage unit 121. For example, when a registration request for new electronic prescription data is received from the medical system 30, the information management unit 131 registers the received electronic prescription data in the electronic prescription storage unit 121. For example, when an electronic prescription data update request has been received from the medicine management system 40, the information management unit 131 updates electronic prescription data to be updated according to the received update request. For example, when an electronic prescription data deletion request has been received from the medicine management system 40, the information management unit 131 deletes electronic prescription data to be deleted according to the received deletion request. Also, a transmission source of the update request or the deletion request need not be limited to the medicine management system 40 described above. For example, the medical system 30 may be a transmission source.

The information provision unit 132 provides the electronic prescription data stored in the electronic prescription storage unit 121 to other information processing devices. For example, when an electronic prescription data request has been received by designating predetermined specific identification information (for example, a URI), the information provision unit 132 provides electronic prescription data associated with the identification information to a request source device in accordance with this request.

The history management system 20 is configured using one or more information processing devices. The history management system 20 is desirably configured using a system in which the stored information is highly reliable. The history management system 20 may be configured as, for example, one information processing device or one information processing system, and configured to store all history information to be managed. The history management system 20 may be configured as, for example, a distributed system configured by connecting a plurality of information processing devices via a network, and may be configured to distribute and store history information to be managed. The history management system 20 may be configured as, for example, a blockchain system. In this case, the blockchain applied to the history management system 20 may be configured as a public type or as a private type.

The history management system 20 manages, for example, information about a history of delivery of delivery target information (hereinafter referred to as a "token") relating to an electronic prescription. The token may have, for example, the following values. Also, when the history management system 20 is configured using blockchain, the token identification information may be implemented as a block number or a contract address.

Token identification information (token ID)
Date of prescription
Date of expiry
Identification information of issuer (for example, physician's ID)
Identification information of current occupant
Identification information of electronic prescription (for example, URI)
Hash value of electronic prescription data For example, an issuance request is transmitted to the history management system 20 in accordance with an operation of a medical worker (for example, a physician) in the medical system 30 and the history management system 20 issues a token in response to the request. The token may be issued, for example, in units of prescriptions, in units of types of medicine, or in units of medicine groups. The token issued in accordance with an operation of a medical worker is delivered to the user terminal 50 of the user (for example, a patient) to whom the electronic prescription corresponding to the token is issued. For delivery, for example, the token held in the medical system 30 may be delivered to the user terminal 50 using a wallet address generated on the basis of a private key held in the medical system 30 and a wallet address generated on the basis of a public key held in the user terminal 50. When such token delivery has been performed, information indicating a history of the delivery is recorded in the history management system 20 in accordance with a process of the medical system 30 or the user terminal 50.

Figure 3:
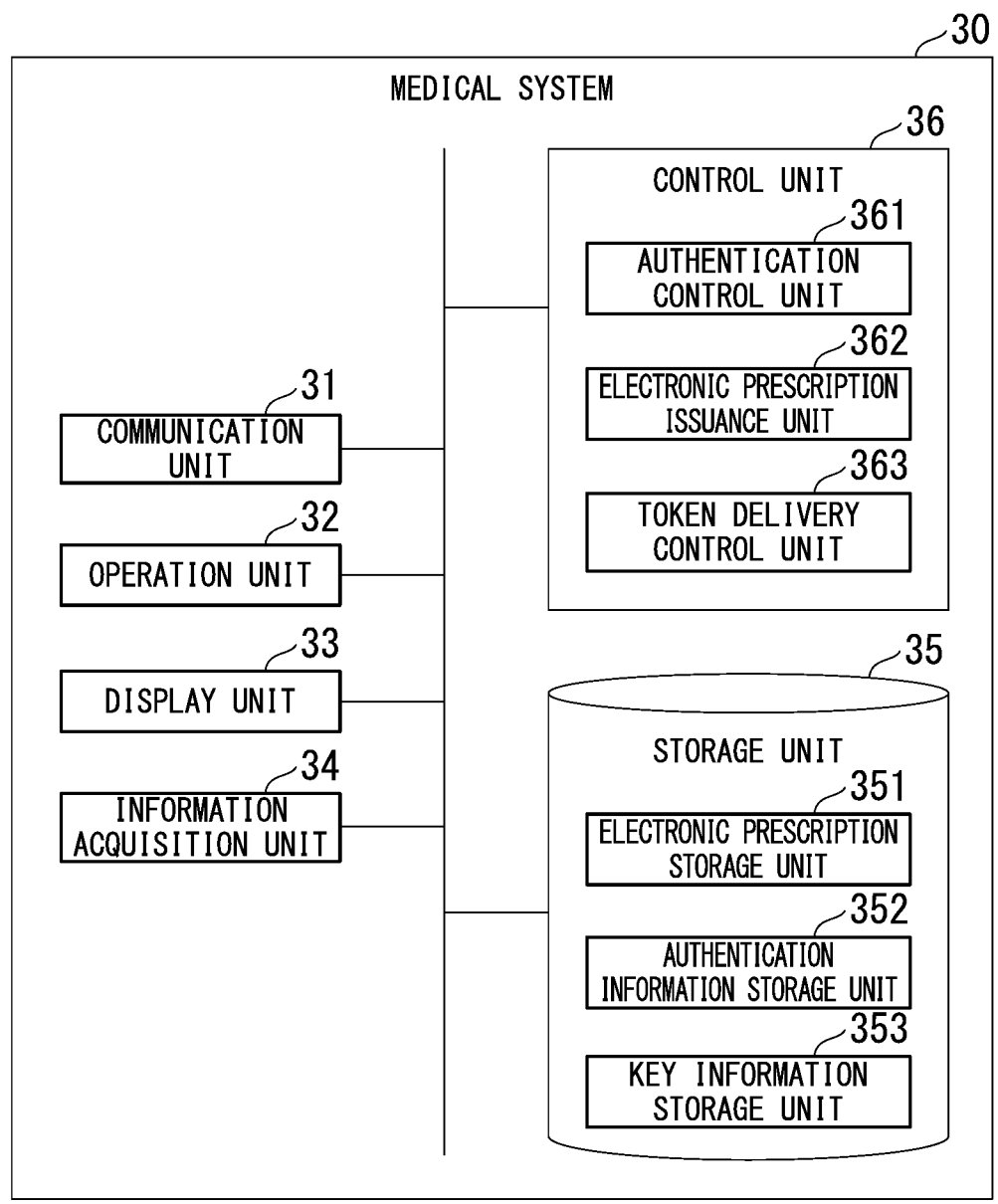
FIG. 3 A schematic block diagram showing a specific example of the functional configuration of a medical system 30.

FIG. 3 is a schematic block diagram showing a specific example of the functional configuration of the medical system 30. The medical system 30 is a system used to manage patient information in medical institutions (for example, hospitals and clinics). The medical system 30 may be configured in compliance with standards such as, for example, FHIR. The medical system 30 performs, for example, a process relating to electronic prescriptions. The medical system 30 is operated by a person who works in a medical institution (hereinafter referred to as a "medical worker"). Specific examples of the medical worker include physicians, nurses, pharmacists, and counter staff. The medical system 30 may be operated by general persons (non-medical personnel) such as patients in relation to a certain process. As a specific example of such a process, there is a process for delivering tokens of electronic prescriptions that have already been issued to oneself.

The medical system 30 is configured using, for example, an information processing device such as a personal computer or a server device. The medical system 30 may be configured using one information processing device or may be configured using a plurality of information processing devices. In the following description, a configuration in which one information processing device is used will be described. The medical system 30 includes a communication unit 31, an operation unit 32, a display unit 33, an information acquisition unit 34, a storage unit 35, and a control unit 36.

The communication unit 31 is a communication device. The communication unit 31 may be configured as, for example, a network interface. The communication unit 31 performs data communication with other devices via the network 90 under the control of the control unit 36. The communication unit 31 may be a device that performs wireless communication or may be a device that performs wired communication.

The operation unit 32 is configured using existing input devices such as a keyboard, a pointing device (a mouse, a tablet, or the like), buttons, and a touch panel. The operation unit 32 is operated when an operator of the medical system 30 (for example, a medical worker or a patient) inputs an instruction to the medical system 30. The operation unit 32 may be an interface for connecting an input device to the medical system 30. In this case, the operation unit 32 inputs an input signal generated according to an input in the input device to the medical system 30. The operation unit 32 may be configured using a microphone and a voice recognition device. In this case, the operation unit 32 performs voice recognition on uttered words and inputs character string information of a recognition result to the medical system 30. The operation unit 32 may be configured in any way as long as it is configured to allow an input of an instruction by a medical worker or the like to the medical system 30.

The display unit 33 is an image display device such as a liquid crystal display or an organic electro luminescence (EL) display. The display unit 33 displays image data and/or text data. The display unit 33 may be an interface for connecting the image display device to the medical system 30. In this case, the display unit 33 generates a video signal for displaying image data and/or text data and outputs the video signal to the image display device connected thereto.

The information acquisition unit 34 acquires information necessary for performing token delivery. The information acquisition unit 34 may be used, for example, to acquire information (for example, a wallet address) indicating the delivery destination of the token. In this case, for example, when the information indicating the delivery destination of the token is expressed as an image of encoded information in a predetermined format (for example, a bar code or a two-dimensional code), the information acquisition unit 34 may be configured using a camera (an image sensor) for capturing the image. For example, if the information indicating the delivery destination of the token is expressed as a radio signal in a predetermined format, the information acquisition unit 34 may be configured using a wireless communication device (for example, a radio frequency identification (RFID) reader or a Bluetooth (registered trademark) device) for receiving the radio signal.

The information acquisition unit 34 may be used, for example, to transmit and receive electronic prescription data itself. In this case, the information acquisition unit 34 transmits the electronic prescription data itself to a transmission destination device (for example, the user terminal 50 of the patient) through wired communication or wireless communication.

The storage unit 35 is configured using a storage device such as a magnetic hard disk device or a semiconductor storage device. The storage unit 35 functions as an electronic prescription storage unit 351, an authentication information storage unit 352, and a key information storage unit 353.

The electronic prescription storage unit 351 stores data of an electronic prescription issued by the medical system 30. The authentication information storage unit 352 stores authentication information used for authenticating an operator who operates the medical system 30. The authentication information storage unit 352 stores, for example, the authentication information of each medical worker or the like who has legitimate authority to operate the medical system 30. The authentication information storage unit 352 may store, for example, a user ID and a password of each medical worker or the like. The authentication information storage unit 352 may store authentication information for two-factor authentication. The key information storage unit 353 stores encryption key information used for token issuance and delivery. The key information storage unit 353 may store, for example, encryption key information. The key information storage unit 353 may store, for example, encryption key information and public key information corresponding to the encryption key information.

The control unit 36 is configured using a processor such as a CPU and a memory. The control unit 36 functions as an authentication control unit 361, an electronic prescription issuance unit 362, and a token delivery control unit 363 when the processor executes programs. Also, all or some of the functions of the control unit 36 may be implemented using hardware such as an ASIC, a PLD, or an FPGA. The above-described program may be recorded on a computer-readable recording medium. Computer-readable recording media include portable media such as a flexible disk, a magneto-optical disc, a ROM, a CD-ROM, and a semiconductor storage device (such as an SSD), a hard disk built into a computer system, and a storage device such as a semiconductor device. The above-described program may be transmitted via a telecommunication circuit.

The authentication control unit 361 authenticates a person who tries to operate the medical system 30. On the basis of authentication information stored in the authentication information storage unit 352, the authentication control unit 361 authenticates whether or not the person who tries to operate the medical system 30 has legitimate authority. A configuration in which only a person authenticated by the authentication control unit 361 can operate the medical system 30 may be adopted or a configuration in which only a person authenticated by the authentication control unit 361 can perform a specific operation (for example, an operation of issuing an electronic prescription) may be adopted.

The electronic prescription issuance unit 362 performs a process of issuing an electronic prescription. The electronic prescription issuance unit 362 generates data of the electronic prescription according to, for example, a predetermined format. The electronic prescription issuance unit 362 registers the generated electronic prescription data in the electronic prescription management device 10. The electronic prescription issuance unit 362 requests the history management system 20 to generate a token for the issued electronic prescription. The electronic prescription issuance unit 362 may issue data of an electronic prescription for each type of medicine prescribed to a patient and request the generation of a token. The electronic prescription issuance unit 362 may transmit the issued electronic prescription data to the user terminal 50 of a legitimate user (for example, a patient to whom the medicine is prescribed by the electronic prescription) through wireless communication or wired communication. At this time, the electronic prescription issuance unit 362 may transmit the electronic prescription data, for example, via the information acquisition unit 34. For example, the transmission of the electronic prescription data may be performed using short-range communication such as Bluetooth (registered trademark) or may be performed through communication via a network such as Wi-Fi (registered trademark) or the Internet.

The token delivery control unit 363 performs a process of delivering a token issued by the history management system 20 to the user terminal 50 of a legitimate user (for example, a patient to whom the medicine is prescribed by the electronic prescription). For example, the token delivery control unit 363 may generate data (data indicating a history) indicating that the token is to be delivered to the user terminal 50 and deliver the token by registering the generated data in the history management system 20. The token delivery control unit 363 may deliver a token by generating data indicating that the token is delivered to the user terminal 50 (data indicating a history) in accordance with the fact that the electronic prescription issuance unit 362 has issued an electronic prescription (or that the electronic prescription issuance unit 362 has transmitted electronic prescription data to the user terminal 50) and registering the generated data in the history management system 20. The process of the token delivery control unit 363 may be implemented in any way as long as the token delivery history (information of a token delivery source, a token delivery destination, a timestamp, and the like) can be registered in the history management system 20.

Figure 4:
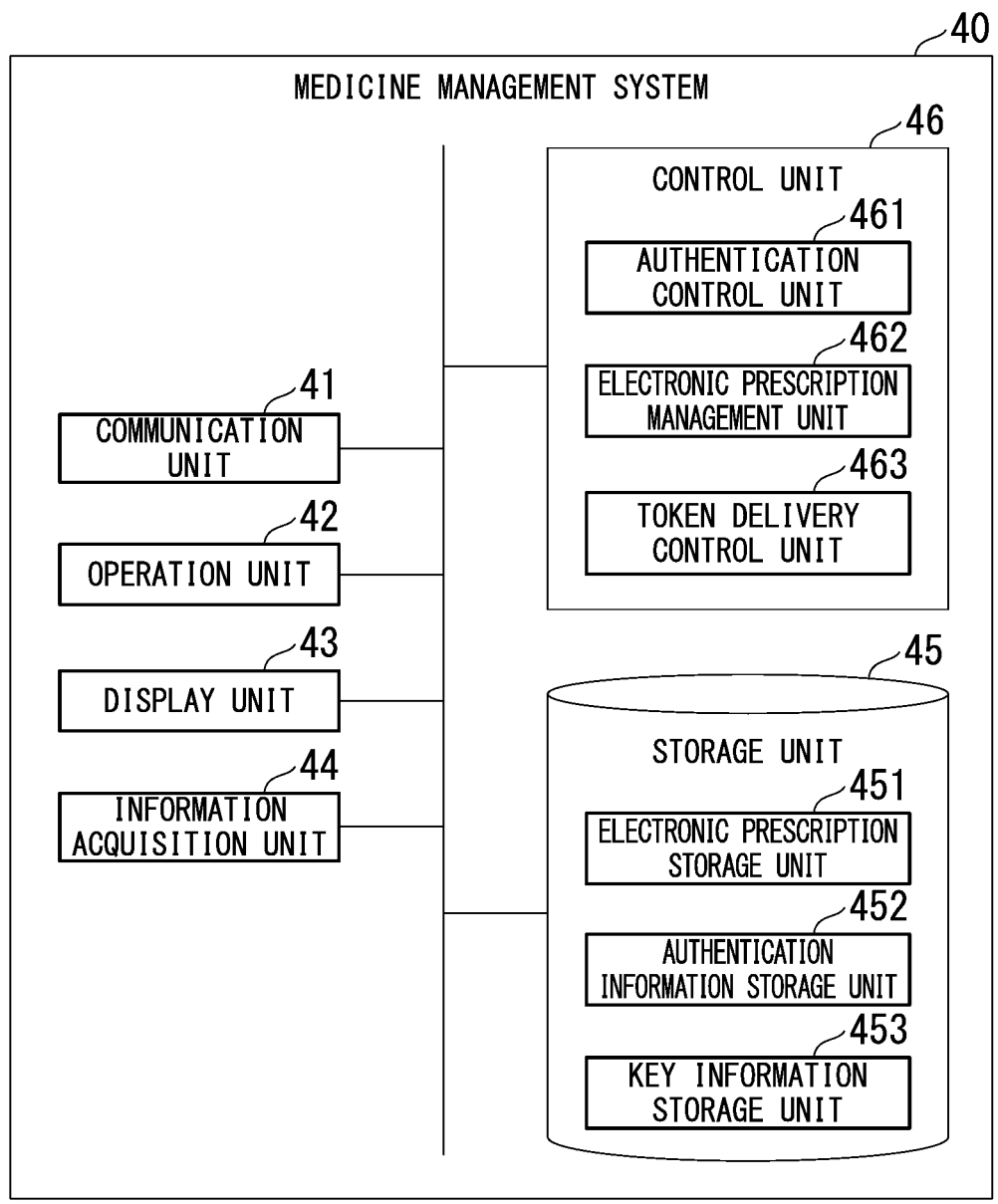
FIG. 4 A schematic block diagram showing a specific example of the functional configuration of a medicine management system 40.

FIG. 4 is a schematic block diagram showing a specific example of a functional configuration of the medicine management system 40. The medicine management system 40 is a system used to manage information about patients and medicines in institutions (for example, pharmacies) that dispense medicines to patients on the basis of electronic prescriptions. The medicine management system 40 may be configured in compliance with standards such as, for example, FHIR. The medicine management system 40 performs, for example, a process relating to electronic prescriptions. The medicine management system 40 is operated by a person who works in a pharmacy (hereinafter referred to as a "dispensing worker"). Specific examples of the dispensing worker include pharmacists and counter staff. The medicine management system 40 may be operated by a general person (a person who is not a dispensing worker) such as a patient in relation to a specific process. As a specific example of such a process, there is a process for delivering a token of an electronic prescription relating to a medicine already delivered for oneself.

The medicine management system 40 is configured using, for example, an information processing device such as a personal computer or a server device. The medicine management system 40 may be configured using one information processing device or may be configured using a plurality of information processing devices. In the following description, a configuration in which one information processing device is used will be described. The medicine management system 40 includes a communication unit 41, an operation unit 42, a display unit 43, an information acquisition unit 44, a storage unit 45, and a control unit 46.

The communication unit 41 is a communication device. The communication unit 41 may be configured as, for example, a network interface. The communication unit 41 performs data communication with other devices via the network 90 under the control of the control unit 46. The communication unit 41 may be a device that performs wireless communication or may be a device that performs wired communication.

The operation unit 42 is configured using existing input devices such as a keyboard, a pointing device (a mouse, a tablet, or the like), buttons, and a touch panel. The operation unit 42 is operated when an operator of the medicine management system 40 (for example, a dispensing worker or a patient) inputs an instruction to the medicine management system 40. The operation unit 42 may be an interface for connecting an input device to the medicine management system 40. In this case, the operation unit 42 inputs an input signal generated according to the input in the input device to the medicine management system 40. The operation unit 42 may be configured using a microphone and a voice recognition device. In this case, the operation unit 42 performs voice recognition on uttered words and inputs character string information of a recognition result to the medicine management system 40. The operation unit 42 may be configured in any way as long as it is configured to allow an input of an instruction from a medical worker or the like to the medicine management system 40.

The display unit 43 is an image display device such as a liquid crystal display or an organic EL display. The display unit 43 displays image data and/or text data. The display unit 43 may be an interface for connecting the image display device to the medicine management system 40. In this case, the display unit 43 generates a video signal for displaying image data and/or text data and outputs the video signal to the image display device connected thereto.

The information acquisition unit 44 acquires information necessary for performing token delivery. The information acquisition unit 44 may be used, for example, to acquire information (for example, a wallet address) indicating the delivery destination of the token. In this case, for example, when the information indicating the delivery destination of the token is expressed as an image of encoded information in a predetermined format (for example, a bar code or a two-dimensional code), the information acquisition unit 44 may be configured using a camera (an image sensor) for capturing the image. For example, if the information indicating the delivery destination of the token is expressed as a radio signal in a predetermined format, the information acquisition unit 44 may be configured using a wireless communication device (for example, an RFID reader or a Bluetooth (registered trademark) device) for receiving the radio signal.

The information acquisition unit 44 may be used, for example, to transmit and receive electronic prescription data itself. In this case, the information acquisition unit 44 may receive the electronic prescription data itself from the transmission source device (for example, the user terminal 50 of the patient) through wired communication or wireless communication or may transmit the electronic prescription data itself to a transmission destination device (for example, the user terminal 50 of the patient).

The storage unit 45 is configured using a storage device such as a magnetic hard disk device or a semiconductor storage device. The storage unit 45 functions as an electronic prescription storage unit 451, an authentication information storage unit 452, and a key information storage unit 453.

The electronic prescription storage unit 451 stores data of an electronic prescription acquired in the medicine management system 40. The authentication information storage unit 452 stores authentication information for use in authenticating an operator who operates the medicine management system 40. The authentication information storage unit 452 stores, for example, authentication information of each dispensing worker or the like who has legitimate authority to operate the medicine management system 40. The authentication information storage unit 452 may store, for example, a user ID and a password of each dispensing worker. The authentication information storage unit 452 may store authentication information for two-factor authentication. The key information storage unit 453 stores encryption key information for use in token delivery. The key information storage unit 453 may store, for example, encryption key information. The key information storage unit 453 may store, for example, encryption key information and public key information corresponding to the encryption key information.

The control unit 46 is configured using a processor such as a CPU and a memory. The control unit 46 functions as an authentication control unit 461, an electronic prescription management unit 462, and a token delivery control unit 463 when the processor executes programs. Also, all or some of the functions of the control unit 36 may be implemented using hardware such as an ASIC, a PLD, or an FPGA. The above-described program may be recorded on a computer-readable recording medium. Computer-readable recording media include portable media such as a flexible disk, a magneto-optical disc, a ROM, a CD-ROM, and a semiconductor storage device (such as an SSD), a hard disk built into a computer system, and a storage device such as a semiconductor device. The above-described program may be transmitted via a telecommunication circuit.

The authentication control unit 461 authenticates a person who tries to operate the medicine management system 40. On the basis of the authentication information stored in the authentication information storage unit 452, the authentication control unit 461 authenticates whether or not the person who tries to operate the medicine management system 40 has legitimate authority. A configuration in which only a person authenticated by the authentication control unit 461 can operate the medicine management system 40 may be adopted or a configuration in which only a person authenticated by the authentication control unit 461 can perform a specific operation (for example, an operation of acquiring an electronic prescription) may be adopted.

The electronic prescription management unit 462 performs a process of managing electronic prescriptions. The electronic prescription management unit 462 may acquire data of an electronic prescription from the electronic prescription management device 10 via the network 90, for example, on the basis of information recorded in a token acquired from the user terminal 50 of the patient. More specifically, the electronic prescription management unit 462 may acquire the electronic prescription data by accessing specific identification information (such as a URI) recorded in the token. The electronic prescription management unit 462 may acquire the electronic prescription data in other methods. For example, the electronic prescription management unit 462 may receive the electronic prescription data from the user terminal 50 through wireless communication or wired communication. At this time, the electronic prescription management unit 462 may receive the electronic prescription data via the information acquisition unit 44. For example, the delivery of the electronic prescription data may be performed using short-range communication such as Bluetooth (registered trademark) or may be performed through communication via a network such as Wi-Fi (registered trademark) or the Internet. The electronic prescription management unit 462 may cause the display unit 43 to display electronic prescription content that is acquired. The electronic prescription management unit 462 may record the acquired electronic prescription data in the electronic prescription storage unit 451.

The token delivery control unit 463 performs a process of receiving the token of the electronic prescription acquired by the electronic prescription management unit 462 from the user terminal 50 of the legitimate user (for example, a patient to whom the medicine was prescribed according to the electronic prescription) or performs a process of delivering the token of the electronic prescription acquired by the electronic prescription management unit 462 to the user terminal 50 of the legitimate user (for example, a patient who received the medicine dispensed according to the electronic prescription). The token delivery control unit 463 may receive the token, for example, by generating data indicating that the token is to be received from the user terminal 50 and registering the generated data in the history management system 20. The token delivery control unit 463 may receive the token, for example, by generating data indicating that the token has been received from the user terminal 50 in accordance with the reception of the electronic prescription data from the user terminal 50 and registering the generated data in the history management system 20. The token delivery control unit 463 may, for example, perform a process of causing the display unit 43 to display information indicating information necessary for receiving the token (for example, a wallet address for reception). The process of the token delivery control unit 463 can be implemented in any way as long as the token delivery history (information of a token delivery source, a token delivery destination, a timestamp, and the like) can be registered in the history management system 20. Also, the token delivery process is similar to that of the token delivery control unit 363.

Figure 5:
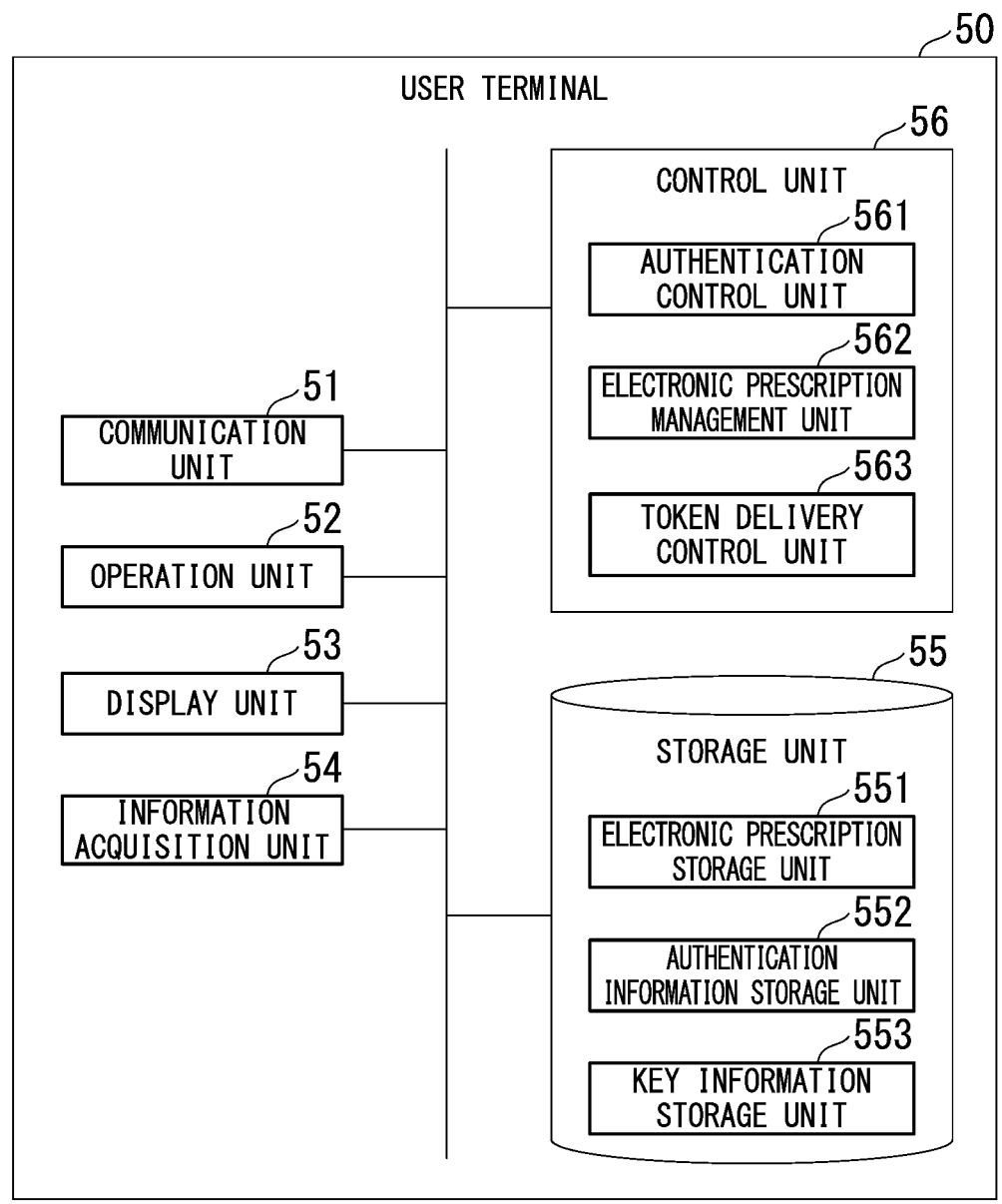
FIG. 5 A schematic block diagram showing a specific example of the functional configuration of a user terminal 50.

FIG. 5 is a schematic block diagram showing a specific example of the functional configuration of the user terminal 50. The user terminal 50 is configured using, for example, a smartphone, a tablet, a personal computer, a mobile game machine, a wearable device such as a smartwatch, or an information device such as a dedicated device. The user terminal 50 includes a communication unit 51, an operation unit 52, a display unit 53, an information acquisition unit 54, a storage unit 55, and a control unit 56.

The communication unit 51 is a communication device. The communication unit 51 may be configured as, for example, a network interface. The communication unit 51 performs data communication with other devices via the network 90 under the control of the control unit 56. The communication unit 51 may be a device that performs wireless communication or may be a device that performs wired communication.

The operation unit 52 is configured using existing input devices such as a keyboard, a pointing device (a mouse, a tablet, or the like), buttons, and a touch panel. The operation unit 52 is operated when an operator of the user terminal 50 (for example, a patient) inputs an instruction to the user terminal 50. The operation unit 52 may be an interface for connecting an input device to the user terminal 50. In this case, the operation unit 52 inputs an input signal generated according to the input in the input device to the user terminal 50. The operation unit 52 may be configured using a microphone and a voice recognition device. In this case, the operation unit 52 performs voice recognition on uttered words and inputs character string information of a recognition result to the user terminal 50. The operation unit 52 may be configured in any way as long as it is configured to allow an input of an instruction from a patient or the like to the user terminal 50.

The display unit 53 is an image display device such as a liquid crystal display or an organic EL display. The display unit 53 displays image data and/or text data. The display unit 53 may be an interface for connecting the image display device to the user terminal 50. In this case, the display unit 53 generates a video signal for displaying image data and/or text data and outputs the video signal to the image display device connected thereto.

The information acquisition unit 54 acquires information necessary for performing token delivery. The information acquisition unit 54 may be used, for example, to acquire information (for example, a wallet address) indicating the delivery destination of the token. In this case, for example, when the information indicating the delivery destination of the token is expressed as an image of encoded information in a predetermined format (for example, a bar code or a two-dimensional code), the information acquisition unit 54 may be configured using a camera (an image sensor) for capturing the image. For example, if the information indicating the delivery destination of the token is expressed as a radio signal in a predetermined format, the information acquisition unit 54 may be configured using a wireless communication device (for example, an RFID reader or a Bluetooth (registered trademark) device) for receiving the radio signal.

The information acquisition unit 54 may be used, for example, to transmit and receive electronic prescription data itself. In this case, the information acquisition unit 54 may receive the electronic prescription data itself from the transmission source device (for example, the medical system 30) through wired communication or wireless communication or may transmit the electronic prescription data itself to the transmission destination device (for example, the medicine management system 40).

The storage unit 55 is configured using a storage device such as a magnetic hard disk device or a semiconductor storage device. The storage unit 55 functions as an electronic prescription storage unit 551, an authentication information storage unit 552, and a key information storage unit 553.

The electronic prescription storage unit 551 stores data of an electronic prescription. The authentication information storage unit 552 stores authentication information for use in authenticating an operator who operates the user terminal 50. The authentication information storage unit 552 stores, for example, authentication information of a user who has legitimate authority to operate the user terminal 50. The authentication information storage unit 552 may store, for example, a user ID and a password issued for the user in advance. The authentication information storage unit 552 may store authentication information for two-factor authentication. The key information storage unit 553 stores encryption key information for use in token delivery. The key information storage unit 553 may store, for example, encryption key information. The key information storage unit 553 may store, for example, encryption key information and public key information corresponding to the encryption key information.

The control unit 56 is configured using a processor such as a CPU and a memory. The control unit 56 functions as an authentication control unit 561, an authentication control unit 561, an electronic prescription management unit 562, and a token delivery control unit 563 when the processor executes programs. Also, all or some of the functions of the control unit 56 may be implemented using hardware such as an ASIC, a PLD, or an FPGA. The above-described program may be recorded on a computer-readable recording medium. Computer-readable recording media include portable media such as a flexible disk, a magneto-optical disc, a ROM, a CD-ROM, and a semiconductor storage device (such as an SSD), a hard disk built into a computer system, and a storage device such as a semiconductor device. The above-described program may be transmitted via a telecommunication circuit.

The authentication control unit 561 authenticates a person who tries to operate the user terminal 50. On the basis of the authentication information stored in the authentication information storage unit 552, the authentication control unit 561 authenticates whether or not the person who tries to operate the user terminal 50 has legitimate authority. A configuration in which only a person authenticated by the authentication control unit 561 can operate the user terminal 50 may be adopted.

The electronic prescription management unit 562 performs a process of managing electronic prescriptions. The electronic prescription management unit 562 may acquire data of an electronic prescription from the electronic prescription management device 10 via the network 90, for example, on the basis of information recorded in a token acquired from the medical system 30. More specifically, the electronic prescription management unit 562 may acquire the electronic prescription data by accessing specific identification information (such as a URI) recorded in the token. The electronic prescription management unit 562 may acquire the electronic prescription data in other methods. For example, the electronic prescription management unit 562 may receive the electronic prescription data from another device (for example, the medical system 30 or the medicine management system 40) through wireless communication or wired communication. At this time, the electronic prescription management unit 562 may receive the electronic prescription data via the information acquisition unit 54. For example, the delivery of the electronic prescription data may be performed using short-range communication such as Bluetooth (registered trademark) or may be performed through communication via a network such as Wi-Fi (registered trademark) or the Internet. The electronic prescription management unit 562 may cause the display unit 53 to display acquired electronic prescription content. The electronic prescription management unit 562 may record the acquired electronic prescription data in the electronic prescription storage unit 551.

The token delivery control unit 563 performs a process of receiving a token of the electronic prescription acquired by the electronic prescription management unit 562 from a legitimate device (for example, the medical system 30 or the medicine management system 40) or a process of delivering the token of the electronic prescription to the legitimate device (for example, the medicine management system 40). The process of the token delivery control unit 563 may be configured, for example, like the token delivery control unit 363 of the medical system 30 or the token delivery control unit 463 of the medicine management system 40.

Figure 6:
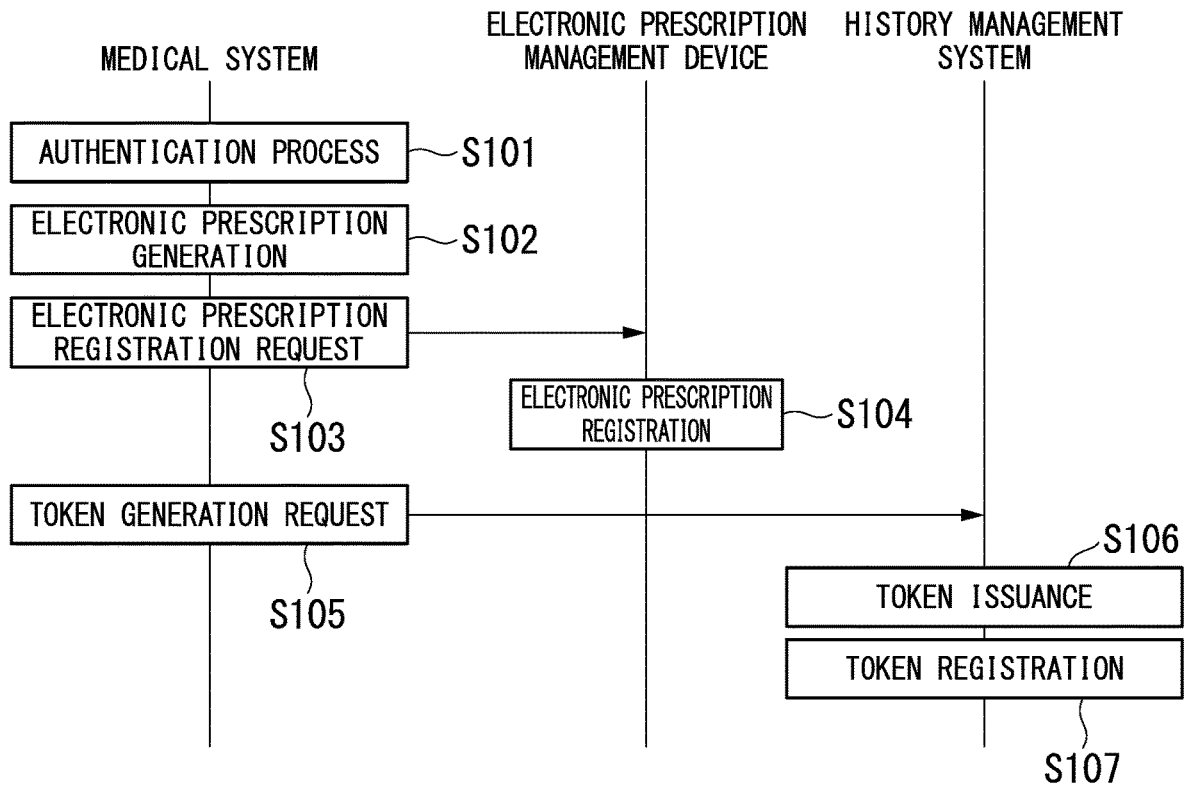
FIG. 6 A sequence chart showing a specific example of a flow of a process when an electronic prescription is issued.

FIG. 6 is a sequence chart showing a specific example of a flow of a process when an electronic prescription is issued. First, an authentication process is executed in the medical system 30 (step S101). A subsequent process of the medical system 30 is a process according to an operation performed by a person who has been authenticated as having legitimate authority in the authentication process. The medical system 30 generates an electronic prescription by inputting information about the prescription to the medical system 30 (step S102). The medical system 30 transmits request data (an electronic prescription registration request) indicating registration of the electronic prescription to the electronic prescription management device 10 (step S103).

When an electronic prescription registration request is received from the legitimate medical system 30, the electronic prescription management device 10 performs requested electronic prescription data registration. The electronic prescription management device 10 issues identification information (for example, a URI) of the registered electronic prescription and transmits the identification information to the medical system 30 that is a registration request source.

The medical system 30 requests the history management system 20 to generate a token including the identification information transmitted from the electronic prescription management device 10 (step S105). In this request, the medical system 30 may transmit a token generation request including, for example, a URI or the like, to the history management system 20. The history management system 20 issues the token requested by the medical system 30 (step S106). Also, the history management system 20 registers the token issued in response to the request (step S107).

Figure 7:
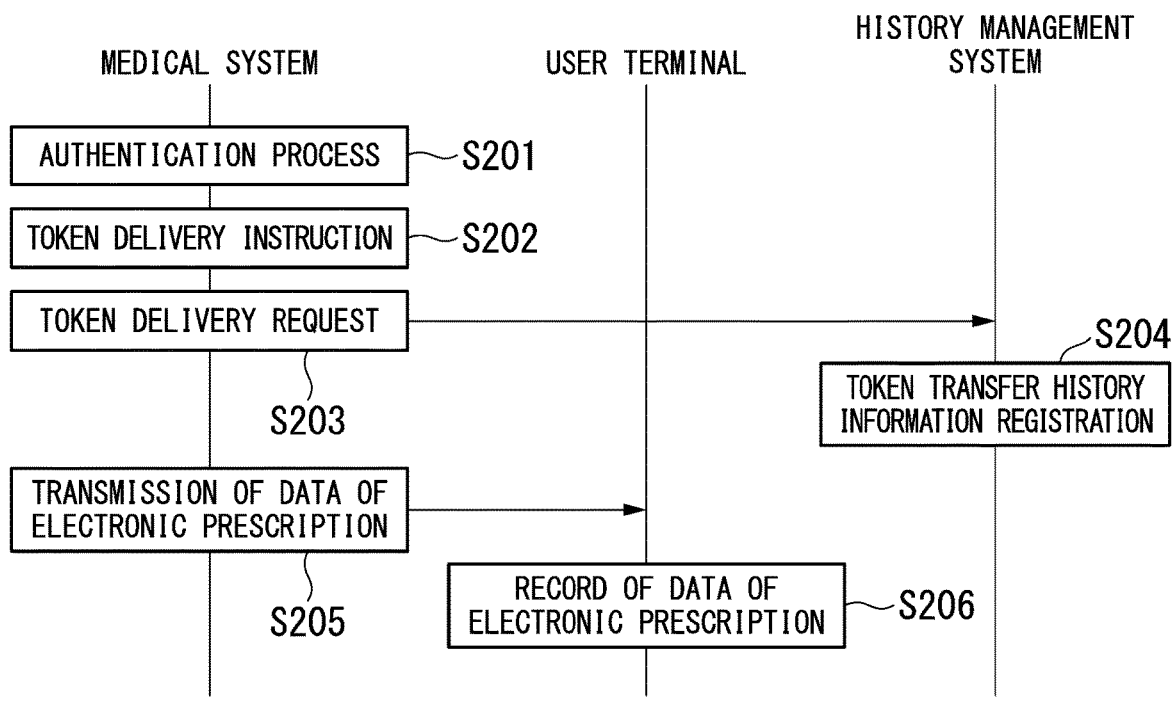
FIG. 7 A sequence chart showing a specific example of a flow of a process when an electronic prescription token is delivered from the medical system 30 to the user terminal 50.

FIG. 7 is a sequence chart showing a specific example of a flow of a process when the electronic prescription token is transferred from the medical system 30 to the user terminal 50. First, an authentication process is executed in the medical system 30 (step S201). A subsequent process of the medical system 30 becomes a process according to an operation performed by a person who has been authenticated as having legitimate authority in the authentication process. In the medical system 30, an operation is performed to instruct the history management system 20 to deliver the token to the user terminal 50 of the patient (step S202). In accordance with the operation, the medical system 30 requests the history management system 20 to deliver the token to the user terminal 50 (step S203). In response to this request, the history management system 20 generates information indicating that the token has been delivered from the medical system 30 to the user terminal 50 (data indicating a history: token transfer history information) and records the generated token transfer history information (step S204). The medical system 30 transmits the electronic prescription data to the user terminal 50 (step S205). When the electronic prescription data is received, the user terminal 50 records the received electronic prescription data in its own device (step S206).

Figure 8:
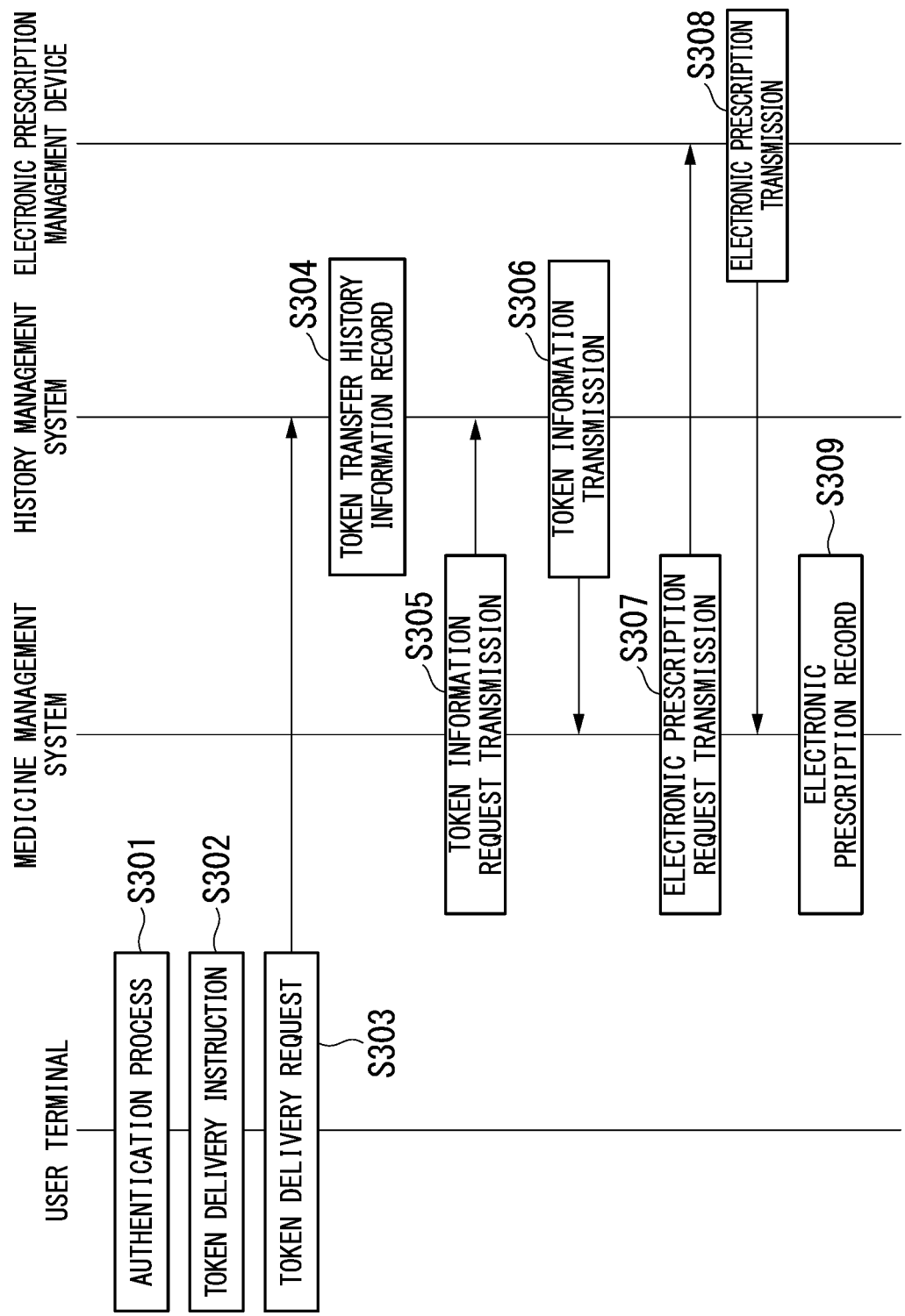
FIG. 8 A sequence chart showing a specific example of a flow of a process when the electronic prescription token is delivered from a user terminal 50 to the medicine management system 40.

FIG. 8 is a sequence chart showing a specific example of a flow of a process when the electronic prescription token is transferred from the user terminal 50 to the medicine management system 40. First, an authentication process is executed in the user terminal 50 (step S301). The subsequent process of the user terminal 50 is a process according to an operation performed by the person who has been authenticated as having legitimate authority in the authentication process. In the user terminal 50, an operation of instructing the history management system 20 to deliver the token to the medicine management system 40 is performed (step S302). In accordance with the operation, the user terminal 50 requests the history management system 20 to deliver the token to the medicine management system 40 (step S303). In response to this request, the history management system 20 generates information indicating that the token has been delivered from the user terminal 50 to the medicine management system 40 (data indicating a history: token transfer history information) and records the generated token transfer history information (step S304).

The medicine management system 40 requests the history management system 20 to provide information about the token (for example, identification information of the electronic prescription) delivered from the user terminal 50 (step S305). The history management system 20 transmits the requested information about the token to the medicine management system 40 (step S306). The medicine management system 40 having received the information about the token acquires data of the electronic prescription on the basis of the received information. For example, the medicine management system 40 transmits information for requesting the electronic prescription data to the electronic prescription management device 10 on the basis of the identification information (for example, a URI) of the electronic prescription (step S307). When the information for requesting the electronic prescription data is received, the electronic prescription management device 10 transmits the requested electronic prescription data to a request source device (the medicine management system 40) (step S308). The medicine management system 40 having received the electronic prescription data records and displays received electronic prescription content (step S309). Also, a process of acquiring the electronic prescription data in steps S305 to S309 may be implemented by transmitting the electronic prescription data from the user terminal 50 to the medicine management system 40 through wireless communication, wired communication, or the like.

Figure 9:
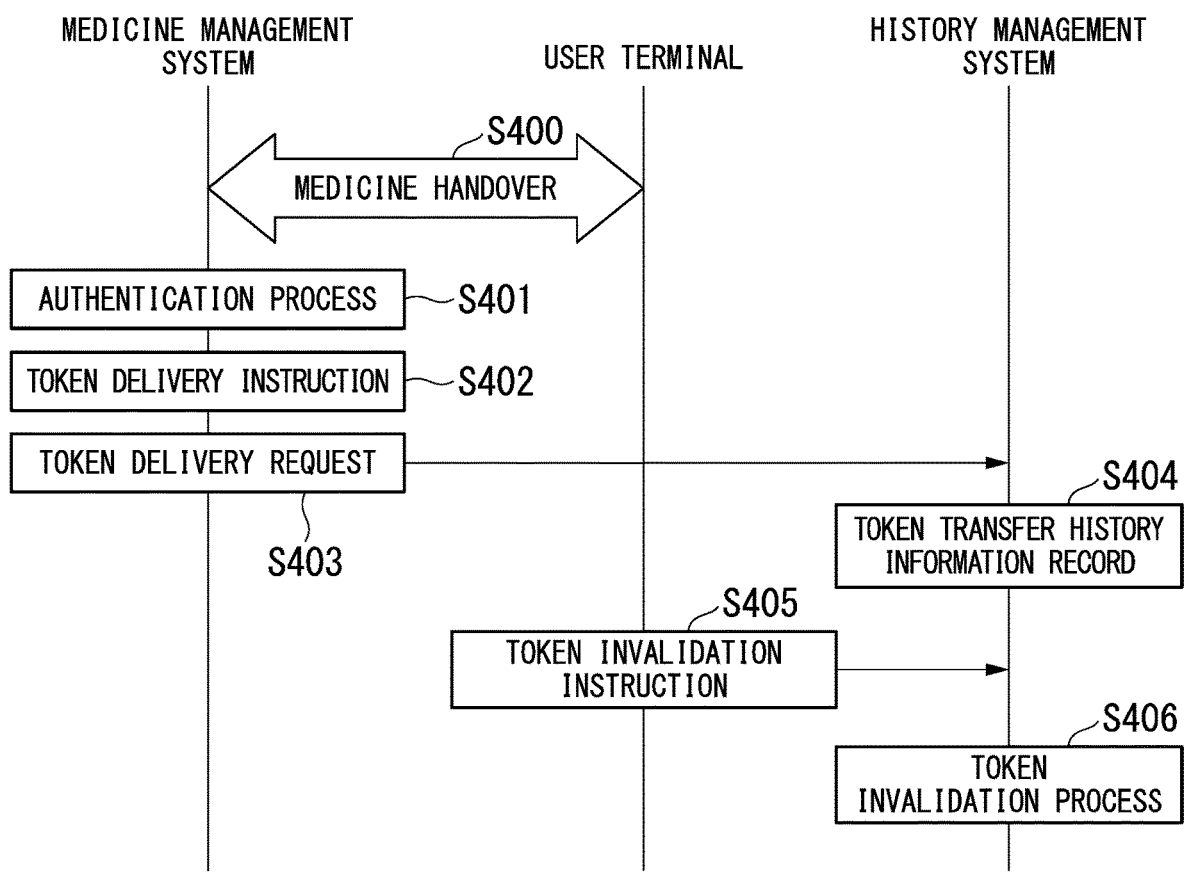
FIG. 9 A sequence chart showing a specific example of a flow of a process when a medicine is dispensed to a user according to an electronic prescription.

FIG. 9 is a sequence chart showing a specific example of a flow of a process when a medicine is dispensed to a user according to an electronic prescription. First, according to electronic prescription content displayed in the medicine management system 40 in step S309 of FIG. 8, the pharmacist dispenses medicine to the user. Also, the dispensed medicine is handed over to the user (step S400). Subsequently, an authentication process is executed in the medicine management system 40 (step S401). A subsequent process of the medicine management system 40 is a process according to an operation performed by a person who has been authenticated as having legitimate authority in the authentication process. Also, this authentication process may be performed before the processing of S307 in FIG. 8. In this case, the processing of step S401 in FIG. 9 may be omitted.

In the medicine management system 40, an operation is performed to instruct the history management system 20 to deliver the token to the user terminal 50 of the user who received the dispensed medicine (step S402). In accordance with the operation, the medicine management system 40 requests the history management system 20 to deliver the token to the user terminal 50 (step S403). In response to this request, the history management system 20 generates information indicating that the token has been delivered from the medicine management system 40 to the user terminal 50 (data indicating a history: token transfer history information) and records the generated token transfer history information (step S404).

The user of the user terminal 50 operates the user terminal 50 and inputs that the medicine has been received in accordance with the acceptance of delivery of the medicine. In accordance with this input, the token delivery control unit 563 of the user terminal 50 instructs the history management system 20 to invalidate the token delivered to its own device (step S405). When the instruction to invalidate the token is received, the history management system 20 performs an invalidation process for the token for which an invalidation instruction has been issued (step S406). The history management system 20 may perform the invalidation process, for example, by recording information indicating that the token has been invalidated.

According to the management system 100 configured in this way, it is possible to improve the convenience of a medicine prescription process. Specifically, it is as follows. In the management system 100, an electronic prescription is issued in a medicine prescription process. Data of the electronic prescription itself is recorded in the electronic prescription management device 10. Data required to acquire the electronic prescription data from the electronic prescription management device 10 (for example, identification information such as a URI) is treated as a token. The token data is managed in the history management system 20 independently of the electronic prescription data. History information about token delivery is recorded in the history management system 20. Therefore, it is possible to secure the validity of delivery of the electronic prescription data. For example, it is possible to confirm that a user serving as medicine prescription target is a legitimate user (i.e., a user to whom a medicine has been prescribed from a medical institution).

Also, the token may also include a hash value of the electronic prescription data. In this case, when a medicine is dispensed in the medicine management system 40, it is possible to check whether the acquired electronic prescription data has been altered. Therefore, it becomes possible to dispense a medicine more accurately in a system using an electronic prescription. Specifically, the following process is performed. The electronic prescription management unit 462 acquires the electronic prescription data and calculates a hash value on the basis of a predetermined hash algorithm that has been predefined. The electronic prescription management unit 462 compares the hash value included in the token with the calculated hash value. When the hash values match, the electronic prescription management unit 462 determines that the acquired electronic prescription data has not been altered. In this case, the electronic prescription management unit 462 may cause the display unit 43 to output a determination result indicating that the data has not been altered. On the other hand, when the hash values do not match, the electronic prescription management unit 462 determines that the acquired electronic prescription data has been altered. In this case, the electronic prescription management unit 462 may output information indicating an error to the display unit 43. This process may be executed by the electronic prescription management unit 562 of the user terminal 50 or may be executed by the agent terminal 60.

MODIFIED EXAMPLES

Token transmission may be substantially performed according to transmission of history information indicating the token transfer. For example, this process may be performed by registering information indicating that the token from the wallet address corresponding to a private key of a transmission source device to a wallet address corresponding to a private key of a transmission destination is transferred in the history management system 20 configured by the blockchain. In this case, information indicating content of the transferred token may be acquired by accessing the history management system 20 using the private key of the transmission destination device in the transmission destination device.

In steps S205 and S206 of FIG. 7, a process in which the user terminal 50 acquires the electronic prescription data may be implemented, for example, in the form in which the user terminal 50 acquires the token information and accesses the electronic prescription management device 10 using the information (for example, identification information of the electronic prescription), for example, as in the processing of S305 to S309 shown in FIG. 8.

Second Embodiment

Figure 10:
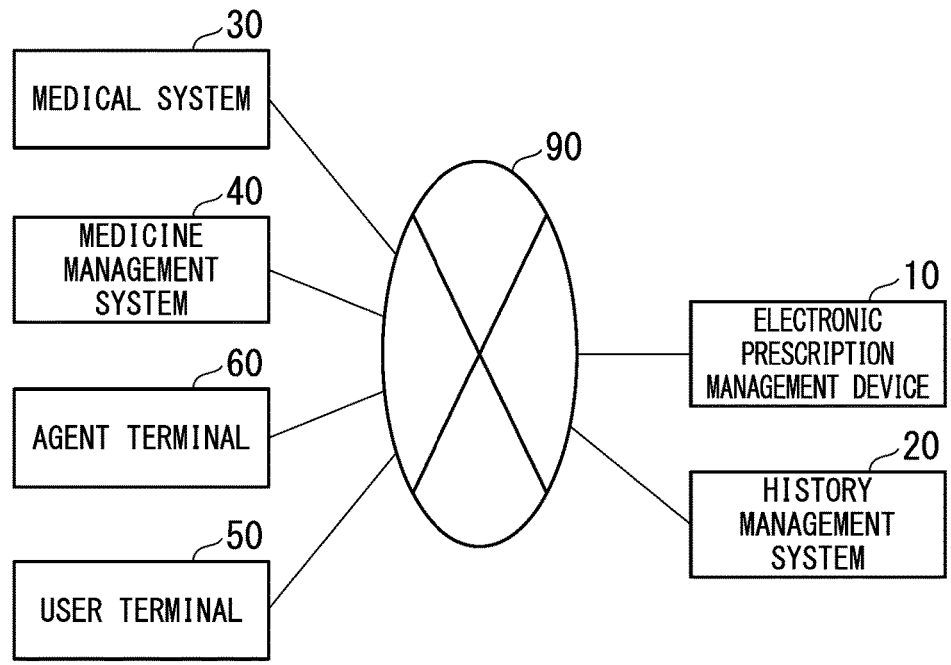
FIG. 10 A schematic block diagram showing the system configuration of a second embodiment of the management system 100 of the present invention.

FIG. 10 is a schematic block diagram showing a system configuration of the second embodiment of the management system 100 of the present invention. Hereinafter, in relation to the management system 100 according to the second embodiment, differences from the management system 100 according to the first embodiment will be mainly described.

The management system 100 according to the second embodiment further includes an agent terminal 60 in addition to an electronic prescription management device 10, a history management system 20, a medical system 30, a medicine management system 40, and a user terminal 50. The electronic prescription management device 10, the history management system 20, the medical system 30, the medicine management system 40, the user terminal 50, and the agent terminal 60 perform communication via a network 90.

The agent terminal 60 is an information device that is operated by an agent. The agent is a person who receives a medicine prescribed for a patient on behalf of the patient and subsequently delivers the medicine to the patient. The agent terminal 60 is configured like the user terminal 50, except that it is operated by the agent. That is, the description of the agent terminal 60 is equivalent to a case where the "user" in the description of the user terminal 50 described above is replaced with the "agent."

Figure 11:
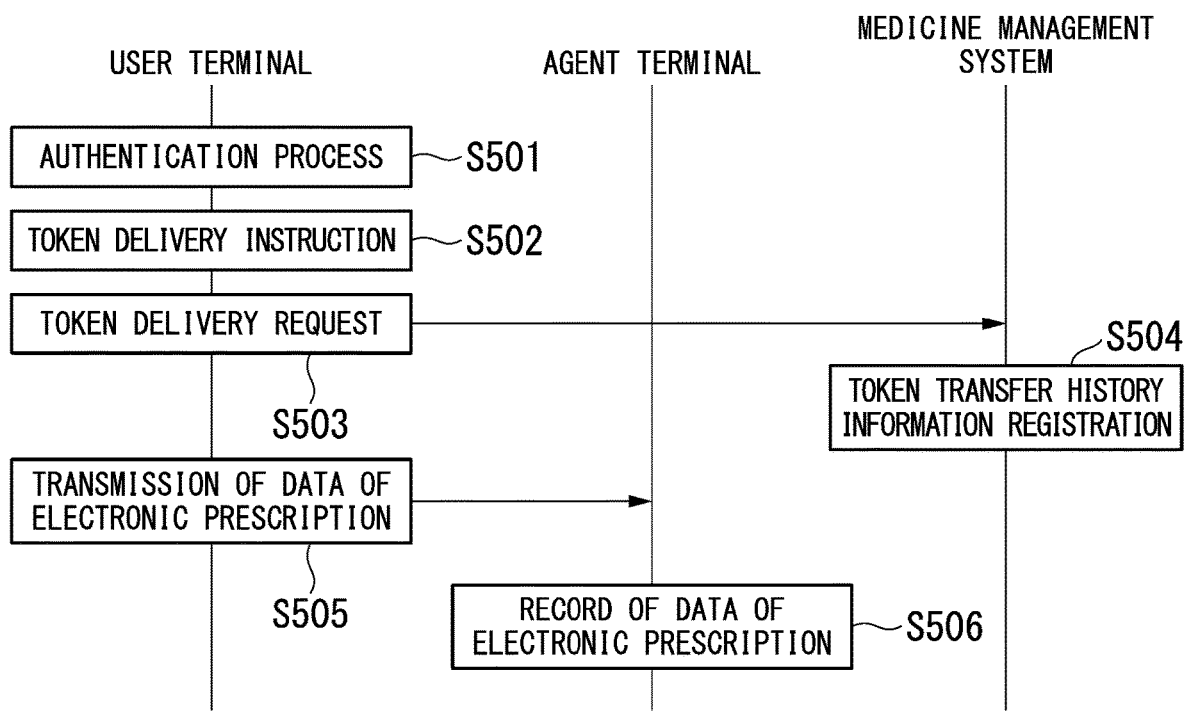
FIG. 11 A sequence chart showing a specific example of a flow of a process when the electronic prescription token is delivered from the user terminal 50 to an agent terminal 60.

FIG. 11 is a sequence chart showing a specific example of a flow of a process when a token of an electronic prescription is delivered from the user terminal 50 to the agent terminal 60. First, an authentication process is executed in the user terminal 50 (step S501). A subsequent process of the user terminal 50 is a process according to an operation performed by a person who has been authenticated as having legitimate authority in the authentication process. In the user terminal 50, an operation is performed to instruct the history management system 20 to deliver the token to the agent terminal 60 (step S502). In accordance with the operation, the user terminal 50 requests the history management system 20 to deliver the token to the agent terminal 60 (step S503). In response to this request, the history management system 20 generates information indicating that the token has been delivered from the user terminal 50 to the agent terminal 60 (data indicating a history: token transfer history information) and records the generated token transfer history information (step S504). The user terminal 50 transmits data of the electronic prescription to the agent terminal 60 (step S505). When the agent terminal 60 receives the electronic prescription data, the agent terminal 60 records the received electronic prescription data in its own device (step S506).

Figure 12:
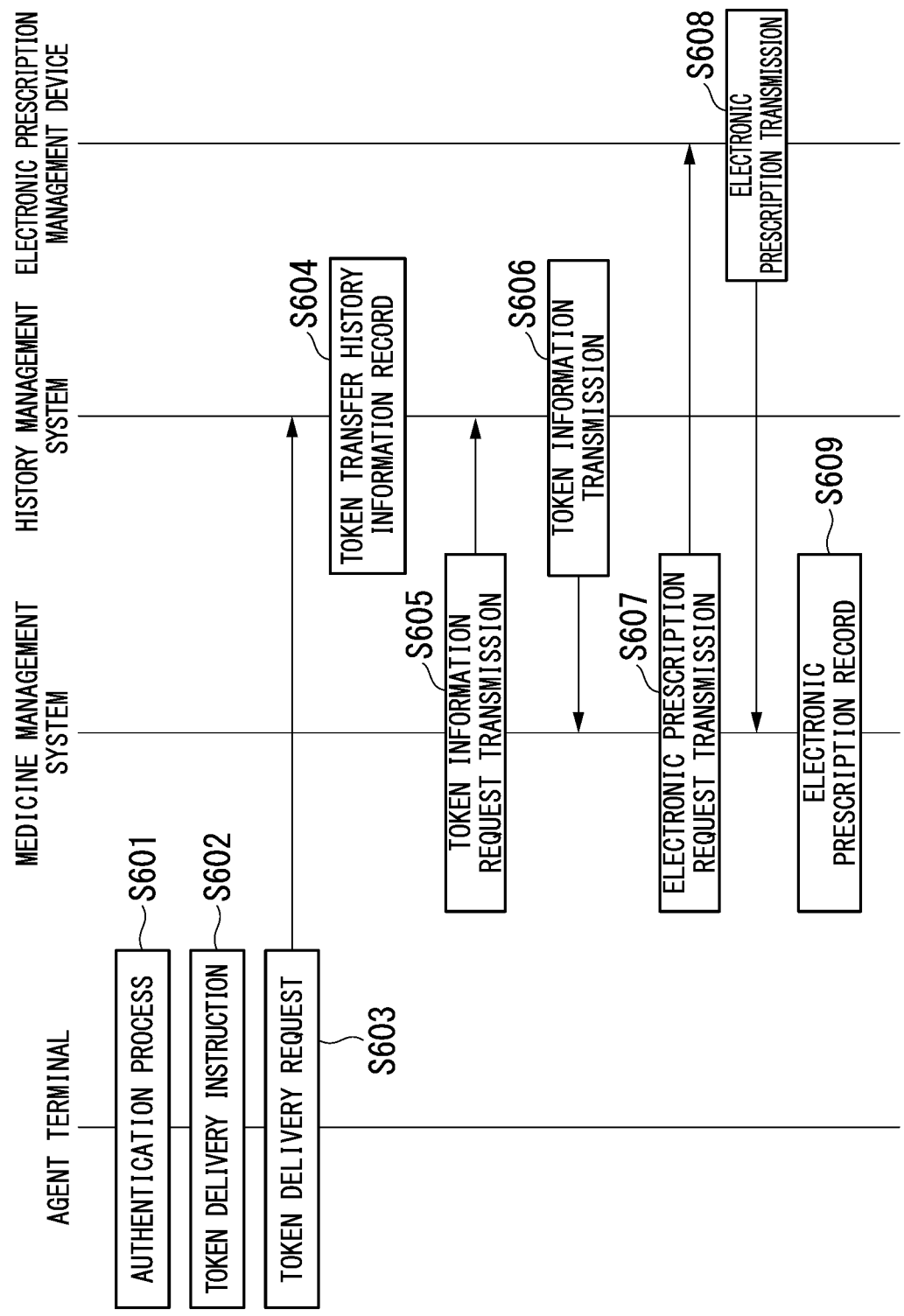
FIG. 12 A sequence chart showing a specific example of a flow of a process when the electronic prescription token is delivered from the agent terminal 60 to the medicine management system 40.

FIG. 12 is a sequence chart showing a specific example of a flow of a process when the token of the electronic prescription is delivered from the agent terminal 60 to the medicine management system 40. First, an authentication process is executed in the agent terminal 60 (step S601). A subsequent process of the agent terminal 60 is a process according to an operation performed by a person (a legitimate agent) who has been authenticated as having legitimate authority in the authentication process. In the agent terminal 60, an operation is performed to instruct the history management system 20 to deliver the token to the medicine management system 40 (step S602). In accordance with the operation, the agent terminal 60 requests the history management system 20 to deliver the token to the medicine management system 40 (step S603). In response to this request, the history management system 20 generates information indicating that the token has been delivered from the agent terminal 60 to the medicine management system 40 (data indicating a history: token transfer history information), and records the generated token transfer history information (step S604). Because the subsequent process is the same as steps S305 to S309 in FIG. 8, description thereof is omitted.

Figure 13:
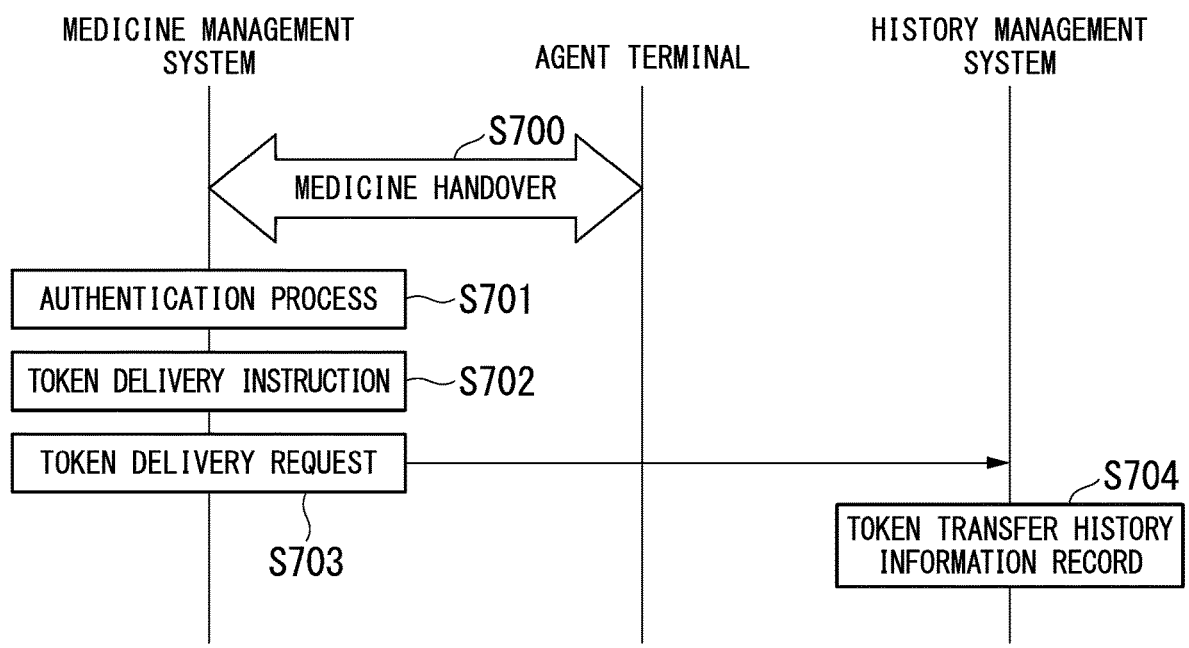
FIG. 13 A sequence chart showing a specific example of a flow of a process when a medicine is dispensed to an agent according to an electronic prescription.

FIG. 13 is a sequence chart showing a specific example of a flow of a process when a medicine is dispensed to an agent according to an electronic prescription. First, according to electronic prescription content displayed in the medicine management system 40 in step S609 of FIG. 12, a pharmacist dispenses the medicine to the user. Also, the dispensed medicine is handed over to the agent for the user (step S700). Subsequently, an authentication process is executed in the medicine management system 40 (step S701). The subsequent process of the medicine management system 40 is a process according to an operation performed by a person who has been authenticated as having legitimate authority in the authentication process. Also, this authentication process may be performed before the processing of S607 in FIG. 12. In this case, the processing of step S701 in FIG. 13 may be omitted.

In the medicine management system 40, an operation is performed to instruct the history management system 20 to deliver the token to the agent terminal 60 of the agent who received the dispensed medicine (step S702). In accordance with the operation, the medicine management system 40 requests the history management system 20 to deliver the token to the agent terminal 60 (step S703). In response to this request, the history management system 20 generates information indicating that the token has been delivered from the medicine management system 40 to the agent terminal 60 (data indicating a history: token transfer history information), and records the generated token transfer history information (step S704).

Figure 14:
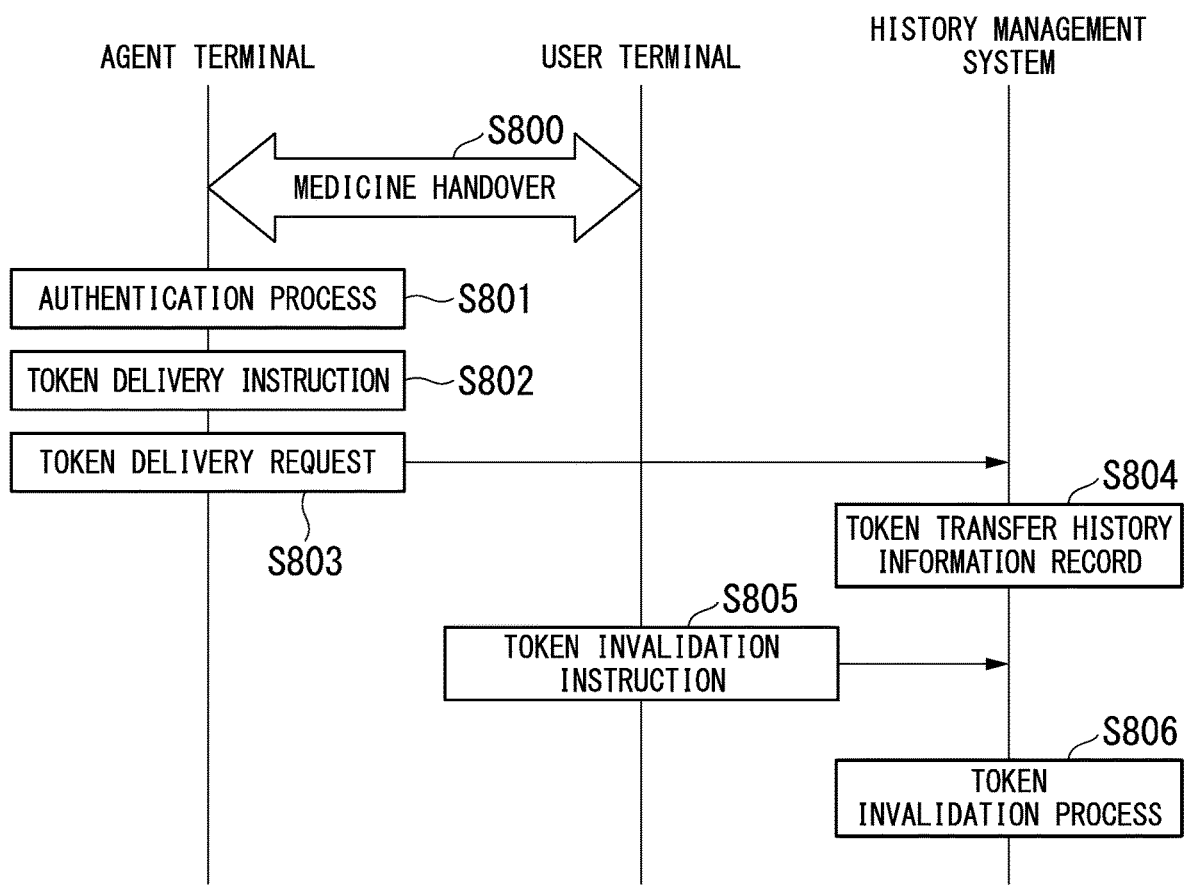
FIG. 14 A sequence chart showing a specific example of a flow of a process when a medicine received by the agent is delivered to the user.

FIG. 14 is a sequence chart showing a specific example of a flow of a process when a medicine received by the agent is handed over to the user. First, the medicine is handed over from the agent to the user (step S800). Subsequently, an authentication process is executed in the agent terminal 60 (step S801). A subsequent process of the agent terminal 60 is a process according to an operation performed by a person who has been authenticated as having legitimate authority in the authentication process.

In the agent terminal 60, an operation is performed to instruct the history management system 20 to deliver the token to the user terminal 50 of the user who received the medicine (step S802). In accordance with the operation, the agent terminal 60 requests the history management system 20 to deliver the token to the user terminal 50 (step S803). In response to this request, the history management system 20 generates information indicating that the token has been delivered from the agent terminal 60 to the user terminal 50 (data indicating a history: token transfer history information) and records the generated token transfer history information (step S804).

The user of the user terminal 50 operates the user terminal 50 in accordance with the acceptance of the delivery of the medicine from the agent and inputs the reception of the medicine. In accordance with this input, the token delivery control unit 563 of the user terminal 50 instructs the history management system 20 to invalidate the token delivered to its own device (step S805). When an instruction to invalidate the token is received, the history management system 20 invalidates the token for which an invalidation instruction has been issued (step S806). The history management system 20 may perform an invalidation process, for example, by recording information indicating that the token has been invalidated.

According to the management system 100 of the second embodiment configured in this way, it is possible to improve the convenience of a medicine prescription process. Specifically, it is as follows. The management system 100 enables an agent to receive a medicine on behalf of a patient in relation to a prescription of the medicine. At that time, it is possible to easily determine that the agent is a legitimate agent in accordance with history information indicating that the token has been delivered to the agent terminal 60. That is, it may be determined that the agent is a legitimate agent in accordance with the delivery of a token including identification information (identification information such as a URI) necessary for acquiring data of the electronic prescription to the agent terminal 60. Also, it becomes possible to more accurately determine whether or not the agent is a legitimate agent by accessing the history management system 20 and confirming the history of the delivery of the token.

MODIFIED EXAMPLES

Token transmission may be substantially performed according to transmission of historical information indicating token transfer. This configuration may be similar to that of the first embodiment.

In steps S505 and S506 of FIG. 11, a process in which the agent terminal 60 acquires the electronic prescription data may be implemented in the form in which the agent terminal 60 acquires token information and receives the electronic prescription data by accessing the electronic prescription management device 10 using the information (for example, the identification information of the electronic prescription), for example, like the processing of S605 to S609 shown in FIG. 12.

Figure 15:
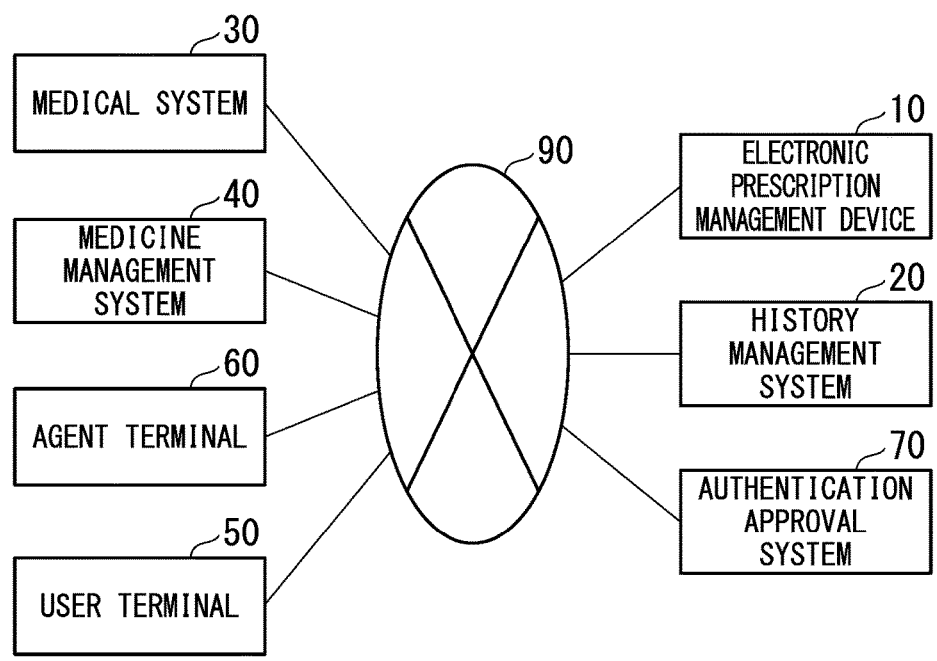
FIG. 15 A diagram showing a configuration of a modified example of the management system 100.

FIG. 15 is a diagram showing a configuration of a modified example of the management system 100. In the management system 100 of the modified example, an authentication approval system 70 is provided. For example, this authentication approval system 70 may be provided in the management system 100 of the first embodiment or may be provided in the management system 100 of the second embodiment. The authentication approval system 70 is configured using one or more information processing devices. The authentication approval system 70 stores authentication information used by the user of the user terminal 50, the agent of the agent terminal 60, and the like in advance. Any information may be used as the authentication information. For example, a combination of an email address (ID) and a password used by the user or the agent may be used as the authentication information. The authentication approval system 70 may store a user identifier assigned to each user in association with the authentication information. The authentication approval system 70 also stores information about user attributes. Specific examples of attribute-related information include a name, sex, and an area of residence (a country, a prefecture, a municipality, a postal code, etc.). An existing authentication protocol may be applied to the authentication approval system 70. For example, open ID connect (OIDC), OAuth, or other authentication protocols may be applied to the authentication approval system 70.

Figure 16:
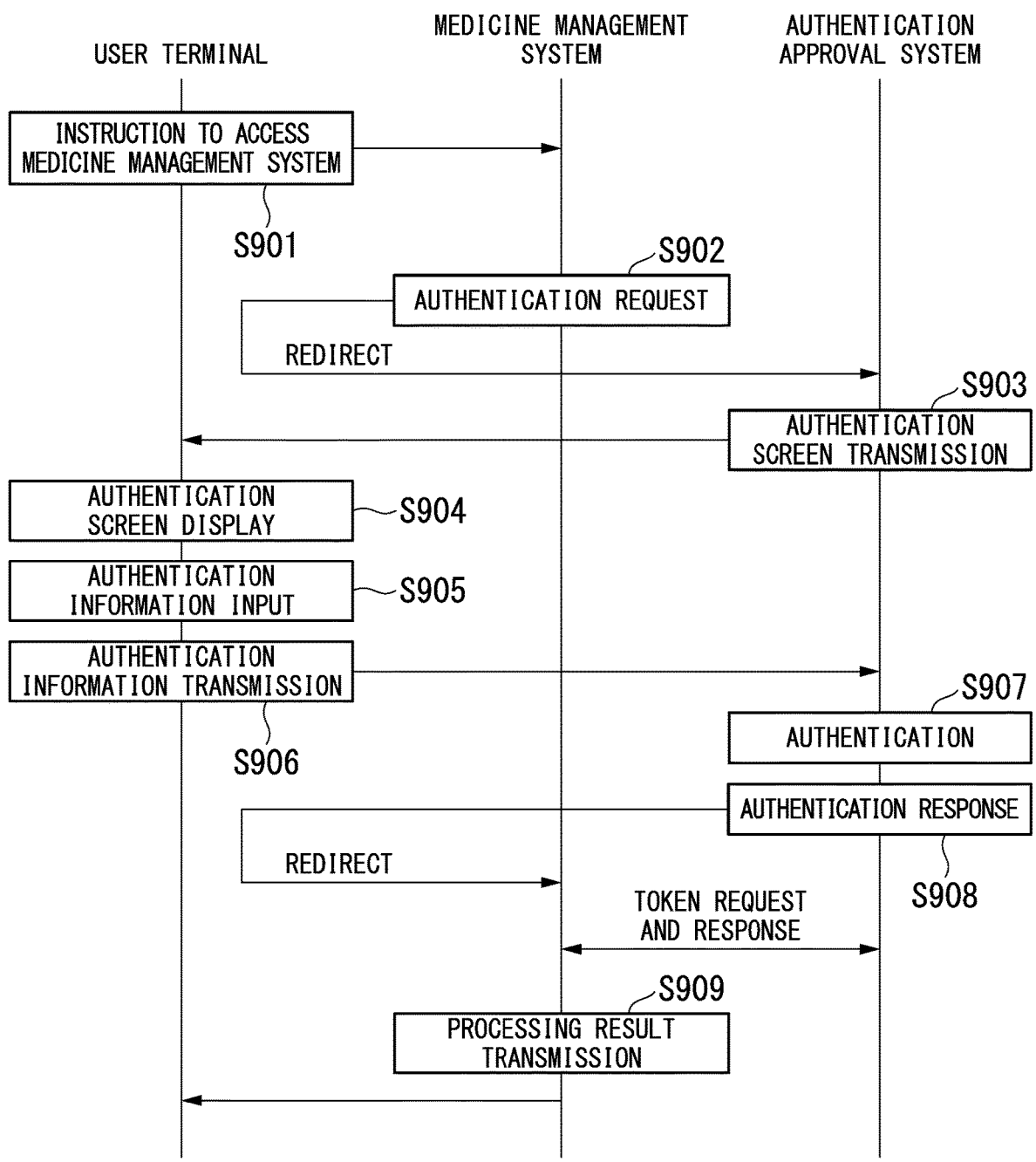
FIG. 16 A diagram showing a specific example of an authentication process in a modified example.

FIG. 16 is a diagram showing a specific example of an authentication process in the modified example. In the first embodiment and the second embodiment, for example, the authentication process as shown in FIG. 16 may be executed in the authentication process of step S301 shown in FIG. 8 or the authentication process of step S401 shown in FIG. 9. The process shown in FIG. 16 will be described below. First, when an instruction to access the medicine management system 40 is input to the user terminal 50 (step S901), the user terminal 50 accesses the medicine management system 40 (step S902). When the medicine management system 40 receives access from the user terminal 50, the medicine management system 40 redirects the user terminal 50 that is an access source to the authentication approval system 70. The authentication approval system 70 transmits authentication screen data to the user terminal 50 (step S903).

The user terminal 50 displays the authentication screen received from the authentication approval system 70 (step S904). The authentication screen includes text or an image for requesting the user to input authentication information. The user inputs the authentication information to the user terminal 50 (step S905). The user terminal 50 transmits the input authentication information to the authentication approval system 70 (step S906). The authentication approval system 70 uses authentication information stored in advance to determine whether or not the received authentication information is valid information. When the received authentication information matches the authentication information stored in advance, the authentication approval system 70 authenticates the user terminal 50 of a transmission source (step S907). The authentication approval system 70 returns authentication response data indicating the authentication result to the medicine management system 40 in a redirect process (step S908). At this time, the authentication approval system 70 distributes a code for accessing a token endpoint.

Subsequently, a token request and response are transmitted and received between the medicine management system 40 and the token endpoint of the authentication approval system 70. At this time, information stored as user attributes in the authentication approval system 70 is distributed. Subsequently, the medicine management system 40 transmits a result of the authentication process to the user terminal 50 (step S909).

In the case of this configuration, the authentication control unit 461 authenticates the user of the user terminal 50 in cooperation with the authentication approval system 70 as described above. Although the authentication process of the medicine management system 40 has been described as an example in FIG. 16, the authentication approval system 70 may be used in the authentication process in other devices. For example, the authentication approval system 70 may be applied in the authentication process of the medical system 30. More specifically, the authentication approval system 70 may be used in the processing of step S101 shown in FIG. 6. For example, the authentication approval system 70 may be applied to user authentication in the user terminal 50.

Although embodiments of the present invention have been described above in detail with reference to the drawings, specific configurations are not limited to the embodiments and other designs and the like may also be included without departing from the spirit and scope of the present invention.

INDUSTRIAL APPLICABILITY

The present invention can be used in medicine prescription technology.

REFERENCE SIGNS LIST

100 Management system
10 Electronic prescription management device
11 Communication unit
12 Storage unit
121 Electronic prescription storage unit
13 Control unit
131 Information management unit
132 Information provision unit
20 History management system
30 Medical system
31 Communication unit
32 Operation unit
33 Display unit
34 Information acquisition unit
35 Storage unit
351 Electronic prescription storage unit
352 Authentication information storage unit 353 Key information storage unit
36 Control unit
361 Authentication control unit
362 Electronic prescription issuance unit
363 Token delivery control unit
40 Medicine management system
41 Communication unit
42 Operation unit
43 Display unit
44 Information acquisition unit
45 Storage unit
451 Electronic prescription storage unit
452 Authentication information storage unit
453 Key information storage unit
46 Control unit
461 Authentication control unit
462 Electronic prescription management unit
463 Token delivery control unit
50 User terminal
51 Communication unit
52 Operation unit
53 Display unit
54 Information acquisition unit
55 Storage unit
551 Electronic prescription storage unit
552 Authentication information storage unit
553 Key information storage unit
56 Control unit
561 Authentication control unit
562 Electronic prescription management unit
563 Token delivery control unit
60 Agent terminal

The invention claimed is:

1. A medical system comprising:
a key information storage configured to store a private key and a public key corresponding to the private key;
an issuer configured to issue data of an electronic prescription relating to a medicine prescribed to a patient, store the electronic prescription in an electronic prescription management device, and instruct a history management system for recording a token delivery history to issue a token that is information of a delivery target relating to the electronic prescription, the history management system being configured using one or more information processing devices and being different from the electronic prescription management device; and
a controller configured to generate a wallet address for the medical system based on the stored private key, generate a wallet address for a terminal of a recipient of the medicine based on the public key of the terminal, instruct the history management system to deliver the token from the wallet address for the medical system to the wallet address for the terminal, and transmit, by using the wallet address of the terminal, the token including an identification information for acquiring the electronic prescription stored in the electronic prescription management device to the terminal, in response to the token delivery history from the wallet address for the medical system to the wallet address for the terminal being registered in the history management system.

2. The medical system according to claim 1, wherein the history management system is configured using blockchain.

3. The medical system according to claim 1, wherein the controller instructs the history management system to deliver the token to a terminal authenticated by an authentication approval system is configured using one or more information processing devices and that performs authentication using authentication information among a plurality of terminals.

4. The medical system according to claim 1, wherein the controller instructs the history management system to deliver the token to an agent terminal, which is a terminal to which the token has been delivered from a user terminal used by the patient, among a plurality of terminals.

5. The medical system according to claim 4, wherein the history management system records information indicating that the token has been delivered to the agent terminal.

6. The medical system according to claim 1, wherein the token includes a hash value of the electronic prescription data.

7. The medical system according to claim 2, wherein the controller instructs the history management system to deliver the token to a terminal authenticated by an authentication approval system that performs authentication using authentication information among a plurality of terminals.

8. The medical system according to claim 2, wherein the controller instructs the history management system to deliver the token to an agent terminal, which is a terminal to which the token has been delivered from a user terminal used by the patient, among a plurality of terminals.

9. The medical system according to claim 3, wherein the controller instructs the history management system to deliver the token to an agent terminal, which is a terminal to which the token has been delivered from a user terminal used by the patient, among a plurality of terminals.

10. The medical system according to claim 2, wherein the token includes a hash value of the electronic prescription data.

11. The medical system according to claim 3, wherein the token includes a hash value of the electronic prescription data.

12. The medical system according to claim 4, wherein the token includes a hash value of the electronic prescription data.

13. A non-transitory computer-readable recording medium recording a computer program for causing a computer to perform processes, the processes comprising:
storing a private key and a public key corresponding to the private key;
issuing data of an electronic prescription relating to a medicine prescribed to a patient, storing the electronic prescription in an electronic prescription management device, and instructing a history management system for recording a token delivery history to issue a token that is information of a delivery target relating to the electronic prescription, the history management system being configured using one or more information processing devices and being different from the electronic prescription management device;
generating a wallet address for the medical system based on the stored private key;
generating a wallet address for a terminal of a recipient of the medicine based on the public key of the terminal;
instructing the history management system to deliver the token from the wallet address for the medical system to the wallet address for the terminal; and
transmitting, by using the wallet address of the terminal, the token including an identification information for acquiring the electronic prescription stored in the electronic prescription management device to the terminal, in response to the token delivery history from the wallet address for the medical system to the wallet address for the terminal being registered in the history management system.

14. A method for a medical system, the method comprising:
- storing a private key and a public key corresponding to the private key;
- issuing data of an electronic prescription relating to a medicine prescribed to a patient, storing the electronic prescription in an electronic prescription management device, and instructing a history management system for recording a token delivery history to issue a token that is information of a delivery target relating to the electronic prescription, the history management system being configured using one or more information processing devices and being different from the electronic prescription management device;
- generating a wallet address for the medical system based on the stored private key;
- generating a wallet address for a terminal of a recipient of the medicine based on the public key of the terminal;
- instructing the history management system to deliver the token from the wallet address for the medical system to the wallet address for the terminal; and
- transmitting, by using the wallet address of the terminal, the token including an identification information for acquiring the electronic prescription stored in the electronic prescription management device to the terminal, in response to the token delivery history from the wallet address for the medical system to the wallet address for the terminal being registered in the history management system.

* * * * *